United States Patent
Sztuk et al.

(10) Patent No.: US 12,333,665 B2
(45) Date of Patent: *Jun. 17, 2025

(54) ARTIFICIAL REALITY SYSTEM WITH VARIFOCAL DISPLAY OF ARTIFICIAL REALITY CONTENT

(71) Applicant: Meta Platforms Technologies, LLC, Menlo Park, CA (US)

(72) Inventors: Sebastian Sztuk, Virum (DK); Saara Khan, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,214

(22) Filed: Oct. 9, 2023

(65) Prior Publication Data

US 2024/0037880 A1  Feb. 1, 2024

Related U.S. Application Data

(63) Continuation of application No. 17/646,811, filed on Jan. 3, 2022, now abandoned, which is a continuation
(Continued)

(51) Int. Cl.
*G06T 19/00* (2011.01)
*G06T 5/70* (2024.01)
(Continued)

(52) U.S. Cl.
CPC ............. *G06T 19/006* (2013.01); *G06T 5/70* (2024.01); *G06T 17/20* (2013.01); *G06V 40/19* (2022.01); *G06T 2207/10028* (2013.01)

(58) Field of Classification Search
CPC ......... G06T 17/20; G06T 19/006; G06T 5/70; G06T 2207/10028; G06V 40/19
See application file for complete search history.

(56) References Cited

U.S. PATENT DOCUMENTS

| 10,319,154 B1 | 6/2019 | Chakravarthula et al. |
| 10,610,775 B1 | 4/2020 | Ebert |

(Continued)

FOREIGN PATENT DOCUMENTS

| CN | 108369325 A | 8/2018 |
| CN | 109477966 A | 3/2019 |

(Continued)

OTHER PUBLICATIONS

International Preliminary Report on Patentability for International Application No. PCT/US2020/058452, mailed Jul. 7, 2022, 8 pages.
(Continued)

*Primary Examiner* — Sing-Wai Wu
(74) *Attorney, Agent, or Firm* — McDermott Will & Emery LLP

(57) ABSTRACT

The disclosure describes artificial reality systems and techniques for providing artificial reality content to a user. For example, an artificial reality system includes a head-mounted display (HMD) configured to output artificial reality content, the HMD including a set of second image capture devices configured to capture image data indicative of a focal point of a gaze of the user and a varifocal display having a focal length that is modifiable based on the focal point of the user. Additionally, the system includes a depth engine configured to generate, based on the real-world image data and depth data associated with the real-world image data, a three-dimensional (3D) scene of the physical environment of the user and generate artificial reality content as an overlay to the 3D scene of the physical environment for display on the varifocal display of the HMD based on the focal point of the user.

20 Claims, 10 Drawing Sheets

Related U.S. Application Data of application No. 16/727,167, filed on Dec. 26, 2019, now Pat. No. 11,217,024.

(51) Int. Cl.
*G06T 17/20* (2006.01)
*G06V 40/19* (2022.01)

(56) References Cited

U.S. PATENT DOCUMENTS

| | | | |
|---|---|---|---|
| 11,217,024 | B2 | 1/2022 | Sztuk et al. |
| 2016/0242642 | A1* | 8/2016 | Migliaccio ............ A61B 5/0022 |
| 2017/0154464 | A1 | 6/2017 | Lanier et al. |
| 2017/0160798 | A1 | 6/2017 | Lanman et al. |
| 2017/0276934 | A1 | 9/2017 | Sarkar |
| 2017/0287215 | A1 | 10/2017 | Lalonde et al. |
| 2018/0089899 | A1 | 3/2018 | Piemonte et al. |
| 2018/0157320 | A1 | 6/2018 | Trail |
| 2018/0300098 | A1 | 10/2018 | Vembar et al. |
| 2019/0018236 | A1 | 1/2019 | Perreault et al. |
| 2019/0101758 | A1 | 4/2019 | Zhu et al. |
| 2019/0197765 | A1 | 6/2019 | Molyneaux et al. |
| 2019/0206132 | A1 | 7/2019 | Zielkowski |
| 2019/0208132 | A1 | 7/2019 | Saito et al. |
| 2019/0258058 | A1 | 8/2019 | Fortin-Desch et al. |
| 2020/0288164 | A1* | 9/2020 | Lin ..................... H04N 19/00 |
| 2022/0130124 | A1 | 4/2022 | Sztuk et al. |

FOREIGN PATENT DOCUMENTS

| | | |
|---|---|---|
| CN | 109478095 A | 3/2019 |
| CN | 110325895 A | 10/2019 |
| CN | 110582718 A | 12/2019 |
| WO | 2018100239 A1 | 6/2018 |
| WO | 2018147811 A1 | 8/2018 |

OTHER PUBLICATIONS

International Search Report and Written Opinion for International Application No. PCT/US2020/058452, mailed Feb. 23, 2021, 10 Pages.

Non-Final Office Action mailed Jun. 7, 2023 for U.S. Appl. No. 17/646,811, filed Jan. 3, 2022, 33 pages.

Prosecution History from U.S. Appl. No. 16/727,167, now issued U.S. Pat. No. 11,217,024, dated Mar. 4, 2021 through Aug. 31, 2021, 58 pages.

Office Action mailed Apr. 1, 2024 for Chinese Application No. 202080080940.X, filed Nov. 1, 2020, 12 pages.

Office Action mailed Jul. 19, 2024 for European Patent Application No. 20811921.4, filed on Nov. 1, 2020, 7 pages.

Office Action mailed Oct. 22, 2024 for Japanese Patent Application No. 2022-522020, filed on Apr. 12, 2022, 6 pages.

* cited by examiner

ARTIFICIAL REALITY SYSTEM WITH VARIFOCAL DISPLAY OF ARTIFICIAL REALITY CONTENT

This application is a continuation of U.S. patent application Ser. No. 17/646,811, filed on Jan. 3, 2022, which is a continuation of U.S. patent application Ser. No. 16/727,167, filed on Dec. 26, 2019, now U.S. Pat. No. 11,217,024, issued on Jan. 4, 2022, both of which are incorporated herein by reference.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely include content that is generated by the system or may include generated content combined with captured content (e.g., real-world video and/or images).

SUMMARY

In general, the disclosure describes an artificial reality system including a varifocal head mounted display (HMD) configured to provide visually accurate artificial reality content to a user. For example, the artificial reality system may be used to provide a pass-through or mixed reality (MR) experience in which real-world image data is reconstructed with a different depth of focus per frame based on where the user of the HMD is looking. The combination of the varifocal HMD and image processing techniques may provide a more realistic three-dimensional (3D) experience and reduce vergence-accommodation conflict compared to current pass-through systems in which the real-world image data is captured and reconstructed with a large depth of field (e.g., focused at infinity). In other examples, the varifocal HMD and image processing techniques may be used to provide a virtual reality (VR) experience or an augmented reality experience.

In one or more examples where the artificial reality system provides a pass-through or MR experience, the varifocal HMD may include at least one pass-through camera configured to capture real-world image data in color (e.g., RGB) and at a high resolution, eye-tracking cameras configured to capture movement of a user's pupils, and a display panel configured to mechanically move relative to one or more lenses within eyepieces of the HMD. In addition, the varifocal HMD may include a depth sensor and/or dual or stereo inside-out cameras configured to capture depth data corresponding to the real-world image data captured by the pass-through camera. In some examples, the varifocal HMD may include one inside-out camera per eye of the user.

According to the disclosed techniques, the AR system may perform image processing techniques to generate a three-dimensional mesh of a real-world scene using the captured depth data, and wrap or overlay texture data generated using the captured real-world image data from the pass-through camera onto the three-dimensional mesh to create a virtual scene for display on the HMD that has true depth.

Once the virtual scene is generated, the techniques described herein modify how the virtual scene is displayed to the user on the HMD in order to mimic a visual effect that the user would experience while focusing on a particular object in the real-world environment corresponding to the virtual scene. For example, one or more eye-tracking cameras of the HMD may capture focus data that includes a position of a pupil of the user in relation to a set of reference points. Using the focus data, the AR may move the focus of the varifocal display in real-time or near real-time to match an identified focal point of the user. Additionally, the AR system may be configured to apply a depth blur or de-focus filter to blur objects represented in the virtual scene that are outside of the identified depth of field of the user of the HMD.

In some examples, an artificial reality system includes a first image capture device configured to capture real-world image data representative of a physical environment of a user and a head-mounted display (HMD) configured to output artificial reality content, the HMD comprising a set of second image capture devices configured to capture image data indicative of a focal point of a gaze of the user and a varifocal display having a focal length that is modifiable based on the focal point of the user. Additionally, the artificial reality system includes a depth engine configured to generate, based on the real-world image data and depth data associated with the real-world image data, a three-dimensional (3D) scene of the physical environment of the user and generate artificial reality content as an overlay to the 3D scene of the physical environment for display on the varifocal display of the HMD based on the focal point of the user.

In some examples, a method includes capturing, by a first image capture device, real-world image data representative of a physical environment of a user; capturing, by a set of second image capture devices of a head-mounted display (HMD) configured to output artificial reality content, image data indicative of a focal point of a gaze of the user; modifying, by a depth engine of the HMD, a focal length of a varifocal display of the HMD based on the focal point of the user; generating, by the depth engine and based on the real-world image data and depth data associated with the real-world image data, a three-dimensional (3D) scene of the physical environment of the user; and generating, by the depth engine, artificial reality content as an overlay to the 3D scene of the physical environment for display on the varifocal display of the HMD based on the focal point of the user.

In some examples, a non-transitory computer-readable medium includes instructions that, when executed, cause one or more processors to: capture real-world image data representative of a physical environment of a user; capture image data indicative of a focal point of a gaze of the user;

modify a focal length of a varifocal display based on the focal point of the user; generate, based on the real-world image data and depth data associated with the real-world image data, a three-dimensional (3D) scene of the physical environment of the user; and generate artificial reality content as an overlay to the 3D scene of the physical environment for display on the varifocal display of a head-mounted display (HMD) based on the focal point of the user.

Further details of one or more examples of this disclosure are set forth in the accompanying drawings and in the description below. Other features, objects, and advantages will be apparent from the description and drawings, and from the claims.

DETAILED DESCRIPTION

Figure 1A:
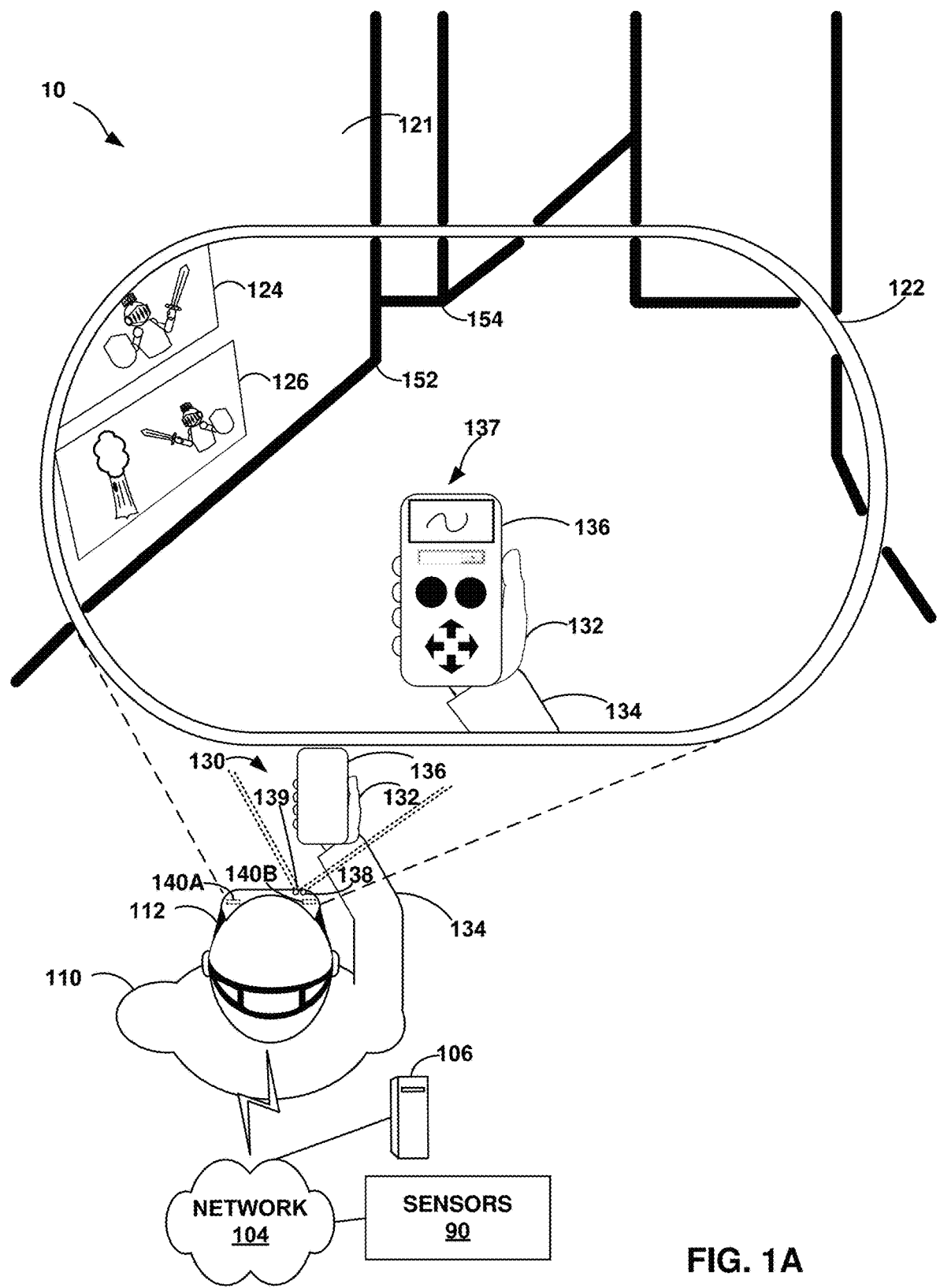
FIG. 1A is a conceptual diagram illustrating an artificial reality system for presenting a virtual scene to a user, in accordance with one or more techniques of this disclosure.

FIG. 1A is a conceptual diagram illustrating an artificial reality system 10 for presenting a virtual scene to a user, in accordance with one or more techniques of this disclosure. In the example of FIG. 1A, artificial reality system 10 includes head mounted display (HMD) 112, peripheral device 136, and may in some examples include one or more external sensors 90 and/or console 106.

As shown, HMD 112 is typically worn by user 110 and includes a varifocal display and optical assembly for presenting artificial reality content 122 to user 110. In addition, HMD 112 includes one or more sensors (e.g., accelerometers) for tracking motion of the HMD 112. HMD 112 may include one or more "inside-out" image capture devices 138 for capturing image data representative of the physical environment surrounding user 110. Additionally, or alternatively, HMD 112 may include one or more "pass-through" image capture devices 139 configured to capture real-world image data such that artificial reality system 10 may pass at least some of the real-world image data to user 110 via HMD 112. In some examples, a resolution of the image data captured by pass-through image capture devices 139 is greater than a resolution of the image data captured by inside-out image capture devices 138. The image data captured by pass-through image capture devices 139 may include image data captured in color and at a higher-resolution than the black-and-white image data captured by inside-out image capture devices 138.

In some examples, HMD 112 may include eye-tracking camera 140A and eye-tracking camera 140B (collectively, "eye-tracking cameras 140"). Each eye-tracking camera of eye-tracking cameras 140 may capture image data indicative of a pupil of user 110 in relation to a respective set of reference points. For example, eye-tracking camera 140A may capture image data indicative of a position of a first pupil of user 110 in relation to a first set of reference points and eye-tracking camera 140B may capture image data indicative of a position of a second pupil of user 110 in relation to a second set of reference points. The image data captured by eye-tracking cameras 140 may be referred to herein as "focus data" because the position of the first pupil in relation to the first set of reference points and the position of the second pupil in relation to the second set of reference points may be indicative of a focal point of user 110 and/or a depth of field of user 110. In some examples, an artificial reality application executing on HMD 112 and/or console 106 may use a gaze tracking algorithm and/or a neural network to generate the focus data based on the image data captured by eye-tracking cameras 140. In some examples, the focus data may be generated based on other information in addition or alternatively to the image data captured by eye-tracking cameras 140. For example, the artificial reality application may determine a gaze of user 110 based on one or more objects in which user 110 is interacting with.

Additionally, HMD 112 may include one or more depth sensors which collect depth data indicative of a depth of one or more points and/or objects in the real-world, three-dimensional (3D) physical environment of user 110. In some examples, the depth sensors may comprise a set of at least two inside-out image capture devices 138. In other examples, the depth sensors may comprise stand-alone depth sensor devices. For example, the depth data may indicate that corner 152 is closer to user 110 than corner 154 (e.g., a depth of corner 152 is less than a depth of corner 154). Although illustrated as a head-mounted display, artificial reality system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by the artificial reality application executing on HMD 112 and/or console 106. In some examples, artificial reality content 122 may include a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, 3D physical environment (e.g., on a surface of a physical object).

In this example, peripheral device 136 is a physical, real-world device having a surface on which artificial reality system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smart ring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, artificial reality system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, 3D physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. In some examples, the artificial reality application may generate a 3D mesh of the physical environment of user 110 using the depth data captured by the one or more depth sensors of HMD 112. In some examples, the 3D mesh may include a set of data points, where a location of each data point of the set of data points relative to each other data point of the set of data points is known. For example, the 3D mesh may indicate that one or more data points representing corner 152 is closer to user 110 than one or more data points representing corner 154. After generating the 3D mesh, the artificial reality application may overlay at least some of the real-world image data captured by pass-through image capture devices 139 on the 3D mesh in order to generate a 3D scene of the physical environment of user 110. Additionally, the artificial reality application may generate artificial reality content 122 as an overlay to the 3D scene of the physical environment for display on a varifocal display of HMD 112 based on a focal point of user 110.

In some examples, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application may determine a current pose for the frame of reference of HMD 112 and, in accordance with the current pose, renders the artificial reality content 122.

The artificial reality application may trigger generation and rendering of virtual content items based on a current field of view 130 of user 110, as may be determined by near real-time gaze tracking of the user (e.g., tracking of image data collected by eye-tracking cameras 140), or other conditions. More specifically, pass-through image capture devices 139 of HMD 112 capture image data representative of objects in the real-world, 3D physical environment that are within a field of view 130 of pass-through image capture devices 139. Field of view 130 typically corresponds with the viewing perspective of HMD 112. In some examples, the artificial reality application presents artificial reality content 122 including mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as objects 124, 126, within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, the artificial reality application performs object recognition within image data captured by inside-out image capture devices 138 of HMD 112 to identify peripheral device 136, hand 132, including optionally identifying individual fingers or the thumb, and/or all or portions of arm 134 of user 110. Further, the artificial reality application tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., SoC) within one or more physical devices. In this example, peripheral device 136 is operationally paired with HMD 112 to jointly operate within artificial reality system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the artificial reality system 10 detects the user interface and performs an action that is rendered to HMD 112.

In some example implementations, as described herein, peripheral device 136 and HMD 112 may each include one or more SoC integrated circuits configured to support an artificial reality application, such as SoCs operating as co-application processors, sensor aggregators, display controllers, etc.

In some examples, the artificial reality application of artificial reality system 10 is configured to generate, based on real-world image data captured by pass-through image capture devices 139 and focus data captured by eye-tracking cameras 140, artificial reality content 122 for display by HMD 112. For example, artificial reality application may determine a focal point of a gaze of the user 110 and/or a depth of field of user 110 based on the focus data captured by the eye-tracking cameras 140. The focus data, in some examples, may represent image data that indicates a position of a first pupil of user 110 in relation to a first set of reference points and image data that indicates a position of a second pupil of user 110 in relation to a second set of reference points. The artificial reality application may determine the focal point of user 110 based on the position of the first pupil in relation to the first set of reference points and the position of the second pupil in relation to the second set of reference points. Focal point may refer to a point or a plane on which the user 110 is focusing. Depth of field may refer to a distance between a nearest object and a farthest object that are in focus (e.g., appearing sharp) in an image or in a scene perceived by a user. As described herein, depth of field may additionally include a distance between the nearest in-focus object and the user, and a distance between the farthest in-focus object and the user.

Additionally, or alternatively, the artificial reality application may determine the focal point of user 110 based on image data captured by inside-out image capture devices 138 pass-through image capture devices 139, a depth projector sensor, or any combination thereof. For example, the artificial reality application may determine the focal point of user 110 based on detecting user interaction with one or more objects in artificial reality content 122. For example, the artificial reality application may determine that a hand 134 of user 110 is holding peripheral device 136 within field of view 130. The artificial reality application may determine that a focal point of user 110 is proximate to peripheral device 136 based on identifying that the user 110 is interacting with peripheral device 136 within field of view 130. In some examples, the artificial reality application may determine the focal point of user 110 based on both of the focus data captured by eye-tracking cameras 140 and the identification of user interaction with one or more objects within field of view 130. In some examples, the artificial reality application may determine the focal point of user 110 based on the focus data captured by eye-tracking cameras 140. In some examples, the artificial reality application may determine the focal point of user 110 based in the identification of user interaction with one or more objects within field of view 130.

In some examples, the artificial reality application may determine the focal point of user 110 based on information relating to one or more pupils and/or corneas of user 110. For example, the image data captured by eye-tracking cameras 140 may include the information relating to the one or more pupils and/or corneas of user 110. In some examples, the image data captured by eye-tracking cameras 140 may include a location of a center of a left pupil and/or a location of a center of a right pupil of user 110. The artificial reality application may determine the focal point of user 110 based on the location of the center of the left pupil and/or the location of the center of the right pupil. In some cases, the artificial reality application may determine the focal point and/or a gaze direction of user 110 based on other information relating to the pupils and/or the corneas of user 110. For example, the artificial reality application may determine the focal point and/or a gaze direction of user 110 based on a shape of a left cornea, a shape of a right cornea, or information indicative of an infrared light reflected off of one or both of the left cornea or the right cornea.

As described above, the artificial reality application may generate a 3D mesh based on depth data collected by one or more depth sensors (e.g., inside-out image capture devices 138) of HMD 112. The 3D mesh may include a set of data points, where a location of each data point of the set of data points relative to each other data point of the set of data points is known. The 3D mesh may represent a topography of a physical environment of user 110. For example, the 3D mesh includes a digital representation of a location of one or more physical objects and/or points (e.g., wall 121, hand 132, arm 134, peripheral device 136, corner 152, and corner 154) within the real-world physical environment of user 110. The 3D mesh may indicate that hand 132 is closer to user 110 than corner 152, for example. Additionally, in some cases, the 3D mesh may indicate a distance between any two or more objects or points within the real-world, 3D physical environment of user 110. The artificial reality application may generate the 3D mesh in near real time so that the 3D mesh reflects changes in the physical environment of user 110. For example, if user 110 moves hand 132, the artificial reality application may update the 3D mesh to account for the movement of hand 132 in near real time. The artificial reality application may generate a 3D scene by overlaying at least a portion of the real-world image data collected by pass-through image capture devices 139 onto the 3D mesh. Additionally, the artificial reality application may generate artificial reality content 122 as an overlay to the 3D scene based on the detected focal point of user 110.

The 3D mesh and eye-tracking cameras 140 may allow the artificial reality application to provide a varifocal experience to user 110. For example, the artificial reality application may identify a depth of field of user 110. As an example, the depth of field may include corner 152 but exclude corner 154, peripheral device 136, hand 132, and arm 134. In turn, the artificial reality application may generate artificial reality content 122 in near real-time to match the depth of field of user 110. In other words, the artificial reality application may generate artificial reality content 122 such that user 110 perceives corner 152 and other points within the depth of field as being sharp, or "in focus" while perceiving corner 154, peripheral device 136, hand 132, arm 134, and other objects or points outside of the depth of field as being blurry, or "out of focus." The 3D mesh indicates a depth of each object included in artificial reality content 122 relative to a position of HMD 112. In this way, to generate artificial reality content 122, the artificial reality application may blur or not blur an object in artificial reality content 122 based on whether a depth of the object as indicated by the 3D mesh is within the detected depth of field of user 110.

In some examples, the artificial reality application may calibrate inside-out image capture devices 138 and other depth sensors based on detecting a focal point of user 110 in relation to one or more objects within artificial reality content 122. In some examples, the artificial reality application may determine that user 110 is focusing on an object in artificial reality content 122, such as corner 152. As such a time, the artificial reality application may determine a focal point of user 110 while user 110 is focusing on corner 152. The artificial reality application may calibrate inside-out image capture devices 138 based on the focal point of user 110 while user 110 is focusing on corner 152 and/or the focal point of user 110 while user 110 is focusing on another object within artificial reality content 122.

HMD 112 may modify a focal length of a varifocal display of HMD 112 based on a detected focal point of user 110. For example, the artificial reality application may detect the focal point of user 110 based on image data collected by eye-tracking cameras 140. In turn, HMD 112 may move the varifocal display of HMD 112 relative to the eyes of user 110. For example, HMD 112 may display artificial reality content 122 to user 110 on the varifocal display which includes a motor (e.g., an electrical motor). The artificial reality application may output an instruction to move the display panel relative to the eyes of the user 110 in order to match the detected focal point of user 110. As such, HMD 112 may implement a mechanical varifocal system which allows the artificial reality application to move the varifocal display. The artificial reality application may determine the focal point of user 110 in near real time. In this way, the artificial reality application may modify the focal length of the varifocal display in near real time, based on the detected focal point of user 110. Additionally, or alternatively, HMD 112 may implement an optical varifocal system which changes a nature of one or more imaging components. Of HMD 112 based on a determined focal point of user 110.

In some examples, the artificial reality application may predict a future focal point of user 110 based on the focus data collected by eye-tracking cameras 140. For example, artificial reality application may track the position of the first pupil of user 110 in relation to the first set of reference points over a period of time and track the position of the second pupil of user 110 in relation to the second set of reference points over the period of time. Subsequently, the artificial reality application may determine, based on a movement of the position of the first pupil in relation to the first set of reference points over the period of time, a projected future movement of the position of the first pupil in relation to the first set of reference points and determine, based on a movement of the position of the second pupil in relation to the second set of reference points over the period of time, a projected future movement of the position of the second pupil in relation to the second set of reference points. The artificial reality application may determine, based on the projected future movement of the position of the first pupil and the projected future movement of the position of the second pupil, a projected future focal point of user 110. In some examples, the artificial reality application may generate artificial reality content 122 and/or modify the focal length of the varifocal display based on the projected future focal length of user 110. Additionally, or alternatively, the artificial reality application may generate artificial reality content 122 and/or modify the focal length of the varifocal display based on both of the projected future focal point of user 110 and a present focal point of user 110.

One or more techniques described herein may provide one or more technical improvements that provide a practical application. For example, by using the focus data captured by the one or more eye-tracking cameras 140 to determine one or both of the focal point and depth of field of the user, the artificial reality application may improve a virtual scene (e.g., artificial reality content 122) displayed by HMD 112 as compared with artificial reality systems that do not use focus data to generate virtual scenes. In other words, artificial reality system 10 may customize artificial reality content 122 to focus on objects that are within a depth of field of user 110, allowing artificial reality system 10 to mimic a real-world environment. Additionally, the three-dimensional mesh may include information indicative of a depth of one or more objects that are part of a real-world environment proximate to user 110 which serves as a basis for the artificial reality content 122 displayed to user 110 by HMD 112. As such, when the user focuses on one or more objects in artificial reality content 122, the HMD 112 may modify the focal length of the varifocal display based on the detected focal point of user 112.

Figure 1B:
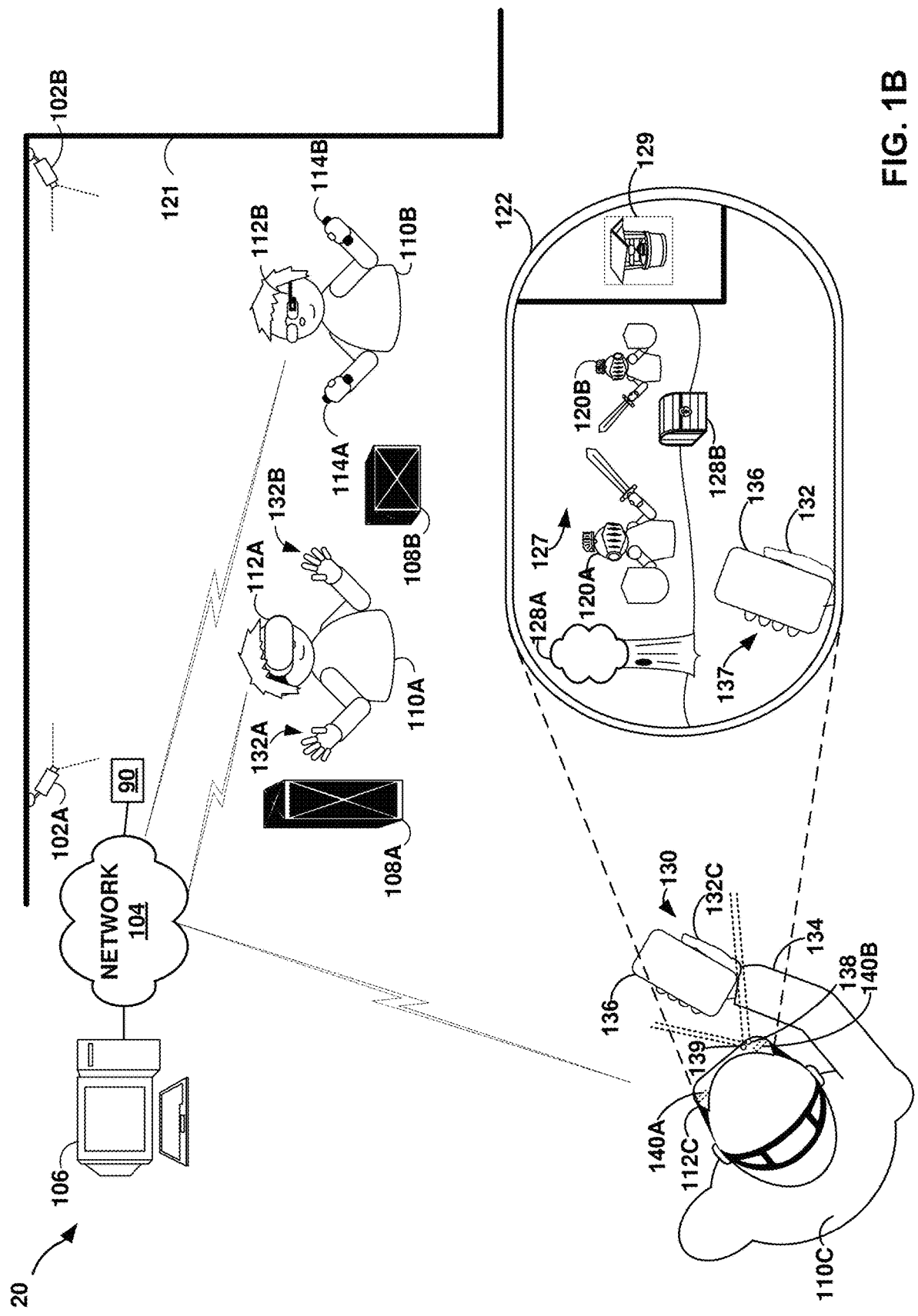
FIG. 1B is conceptual diagram illustrating an artificial reality system for presenting a virtual environment to more than one user, in accordance with one or more techniques of this disclosure.

FIG. 1B is conceptual diagram illustrating an artificial reality system 20 for presenting a virtual environment to more than one user, in accordance with one or more techniques of this disclosure. Similar to artificial reality system 10 of FIG. 1A, in some examples, artificial reality system 20 of FIG. 1B may generate and render virtual content items within a multi-user artificial reality environment. Artificial reality system 20 may also, in various examples, generate and render certain virtual content items and/or graphical user interface elements to a user in response to detection of one or more particular interactions with peripheral device 136 by the user.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial reality content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively. HMD 112C may be an example of HMD 112 of FIG. 1.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In some examples, console 106 and/or HMD 112C of artificial reality system 20 may generate and render a virtual surface including virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via image capture device 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some examples, the artificial reality application can run on console 106, and can utilize external cameras 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

External cameras 102 and inside-out image capture devices 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits configured to enable an operating environment for artificial reality applications.

In some examples, each HMD of HMDs 112 includes one or more image capture devices and one or more eye-tracking cameras. For example, HMD 112C includes inside-out image capture devices 138, pass-through image capture devices 139, and eye tracking cameras 140A-140B (collectively, "eye-tracking cameras 140). The artificial reality application may generate artificial reality content for display by any one or more of HMDs 112. Each of HMDs 112 may perform any one or more techniques described with respect to HMD 112 of FIG. 1.

Figure 2A:
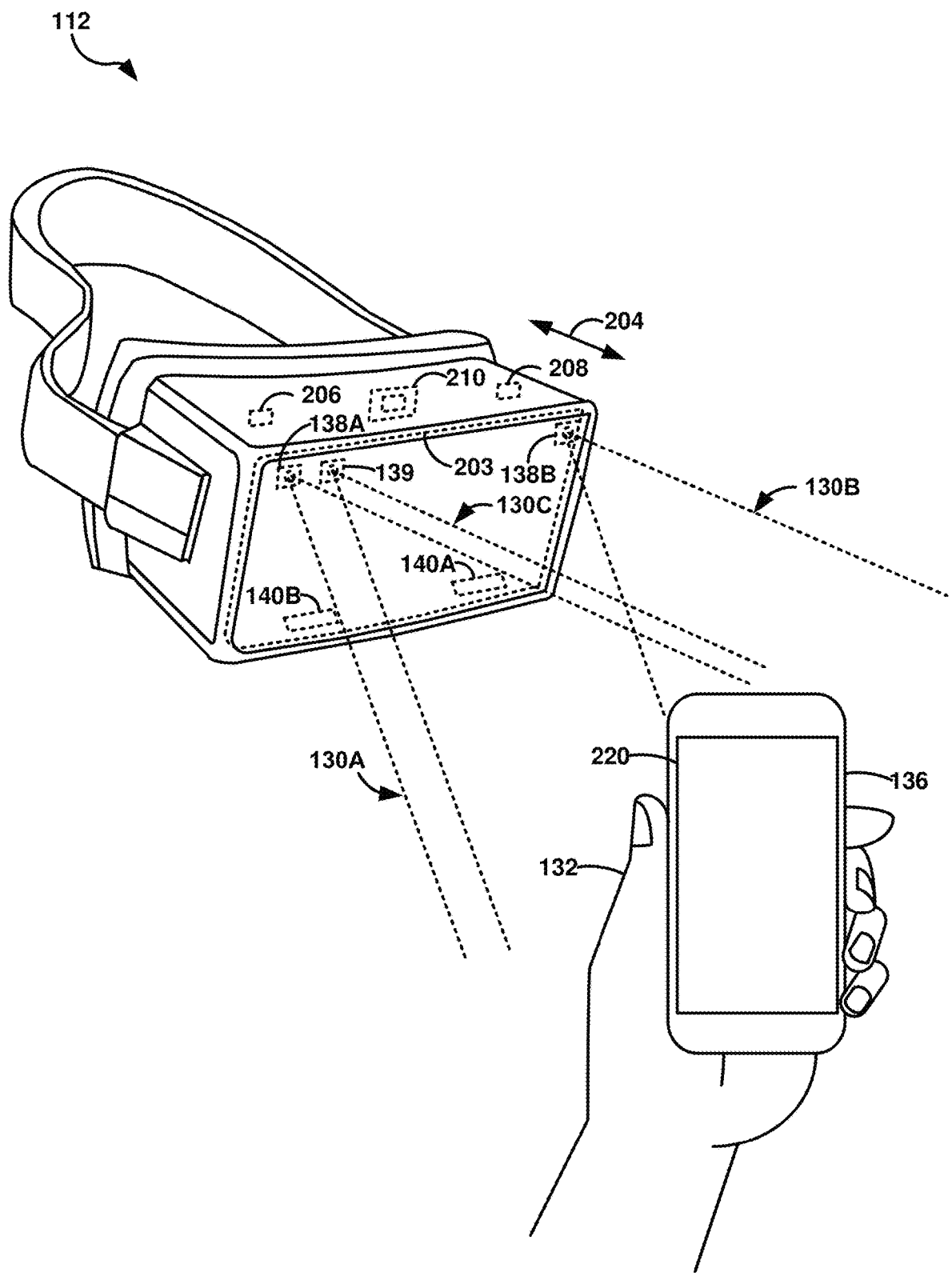
FIG. 2A is a conceptual diagram illustrating an example head mounted display (HMD) and an example peripheral device for presenting a virtual scene to a user, in accordance with one or more techniques of this disclosure.

FIG. 2A is a conceptual diagram illustrating an example HMD 112 and an example peripheral device 136 for presenting a virtual scene to a user, in accordance with one or more techniques of this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing varifocal display 203 configured to present artificial reality content to the user. Varifocal display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the varifocal display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles. In some examples, HMD 112 may include a single varifocal display 203 to provide images to both the user's eyes, sequentially or simultaneously. In some examples, HMD 112 may include two varifocal displays, or one varifocal display per eye of user 110. In some examples, HMD 112 may include pupil-replicating waveguides used to carry images in an angular domain generated by miniature projectors directly to the user's eyes.

In some examples, display 203 may move within HMD 112 along axis 204. For example, movement of display 203 may be controlled by a motor (e.g., an electric motor)

configured to move display 203 closer to or farther away from eye(s) of the user of HMD 112. By moving display 203, the user of HMD 112 may change a way in which the user focuses on the artificial reality content presented by display 203. For example, moving display 203 closer to the eyes of the user or moving display 203 further from the eyes of the user may cause the focal length of display 203 to match the focal point of the user. In this way, HMD 112 may represent a varifocal device, since HMD 112 is configured to change a focus of the artificial reality content presented by display 203.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may collect depth data indicative of a depth of one or more points and/or objects in the real-world, 3D physical environment of the user of HMD 112. In some examples depth sensors 208 may collect the depth data. In some examples inside-out image capture devices 138 may collect the image data.

HMD 112 may include integrated inside-out image capture devices 138A and 138B (collectively, "inside-out image capture devices 138"), such as video cameras, laser scanners, Doppler radar scanners, depth scanners, or the like, configured to capture image data representative of the physical environment. More specifically, inside-out image capture devices 138 capture image data representative of objects (including peripheral device 136 and/or hand 132) in the physical environment that are within a field of view 130A, 130B of inside-out image capture devices 138, which typically corresponds with the viewing perspective of HMD 112. In some examples, two or more of inside-out image capture devices 138 may collect the depth data indicative of a depth of one or more points and/or objects in the real-world, 3D physical environment of the user of HMD 112. In this way, inside-out image capture devices 138 may represent depth sensors 208. In other cases, inside-out image capture devices 138 and depth sensors 208 may be separate devices.

HMD 112 may include one or more pass-through image capture devices 139. Pass-through image capture devices 139 may be configured to capture real-world image data in color and at a higher resolution than inside-out image capture devices 138, allowing artificial reality system to display, or "pass," at least some of the real-world image data to a user via HMD 112. In other words, HMD 112 may display a virtual scene to the user which includes one or more elements, objects, and aspects of a real-world scene that the user would see without using HMD 112.

HMD 112 includes an internal control unit 210, which may include an internal power source and one or more printed-circuit boards having one or more processors, memory, and hardware to provide an operating environment for executing programmable operations to process sensed data and present artificial reality content on display 203. One or more techniques described herein as being performed by control unit 210 may, in some examples, be performed by any one or combination of console 106, peripheral device 136, and HMD 112.

HMD 112 may include eye-tracking camera 140A and eye-tracking camera 140B (collectively, "eye-tracking cameras 140"). Each eye-tracking camera of eye-tracking cameras 140 may capture image data indicative of a pupil of the user of HMD 112 in relation to a respective set of reference points. For example, eye-tracking camera 140A may capture image data indicative of a position of a first pupil (e.g., a left pupil) of the user in relation to a first set of reference points and eye-tracking camera 140B may capture image data indicative of a position of a second pupil (e.g., a right pupil) of the user in relation to a second set of reference points. In some examples, image data captured by eye-tracking cameras 140 may represent focus data because the position of the first pupil in relation to the first set of reference points and the position of the second pupil in relation to the second set of reference points may be indicative of a depth of field (e.g., a focus) of the user.

Depth of field may represent a distance between a nearest object and a farthest object that are in focus (e.g., appearing sharp) in an image or in a scene perceived by a user. As described herein, depth of field may additionally include a distance between the nearest in-focus object and the user, and a distance between the farthest in-focus object and the user. For example, if a nearest object in focus to an observer is 10 meters away from the observer and a farthest object in focus to an observer is 11.5 meters away from the observer, the depth of focus of the observer is 1.5 meters. In such an example, objects closer than 10 meters and objects farther than 12 meters may appear blurry to the observer and objects within a range from 10 meters to 12 meters may appear sharp to the observer. In some examples, a depth of field of image data captured by pass-through image capture devices 139 may be proportional to a "distance to subject," which is a distance between pass-through image capture devices 139 and an object in which image capture devices 139 focus on. In a case where image capture devices 139 are focusing on peripheral device within artificial reality content 122, a depth of filed of the image data captured by image capture devices 139 may be smaller than in a case where image capture devices 139 are focusing on corner 154, for example. An optical power of a lens may, in some cases, also be a function of distance. For example, an optical power of a lens is inversely proportional to a focal length of the lens. A diopter is a unit of measurement of an optical power of a lens.

In one example, control unit 210 is configured to, based on the sensed data (e.g., image data captured by any one or more of image capture devices 102, inside-out image capture devices 138, and pass-through image capture devices 139, and position information from GPS sensors), generate and render for display on display 203 one or more virtual content items (e.g., virtual content items 124, 126 of FIG. 1A) associated with a position contained within field of view 130A, 130B of inside-out image capture devices 138 or within field of view 130C of image capture device 139. As explained with reference to FIGS. 1A-1B, a virtual content item may be associated with a position within a real-world environment, and control unit 210 can be configured to render the virtual content item (or portion thereof) for display on display 203 in response to a determination that the position associated with the virtual content (or portion therefore) is within the current field of view 130A, 130B.

In one example, control unit 210 is configured to, based on the sensed data, identify a specific gesture or combination of gestures performed by the user and, in response, perform an action. For example, in response to one identified gesture, control unit 210 may generate and render a specific user interface for display on varifocal display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by inside-out image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize inside-out image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and enable the user to interface with that UI menu based on detection of a user interface gesture, selection gesture, stamping gesture, translation gesture, rotation gesture, and drawing gesture performed by the user with respect to the peripheral device, as described in further detail below.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on surface 220 and detect user input (e.g., touch or hover input) on surface 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

Control unit 210 may generate the artificial reality content presented by display 203. One way in which the control unit 210 may generate artificial reality content presented by display 203 is to blur one or more portions of the artificial reality content that are outside of the depth of field of the user of HMD 112. A 3D mesh may indicate a depth of each object included in the artificial reality content relative to a position of HMD 112. In this way, to generate the artificial reality content, control unit 210 may blur or not blur an object in the artificial reality content based on whether a depth of the object as indicated by the 3D mesh is within the depth of field of the user. Additionally, control unit 210 may move varifocal display 203 along axis 204 in order to modify a focal length of varifocal display 203. For example, HMD 112 may present the artificial reality content to the user on varifocal display 203, which is attached to a motor (e.g., an electrical motor). Control unit 210 may move varifocal display 203 in order to reflect a detected focal point of the user. In some examples, the focal point of the user may be determined in near real time based on the image data captured by eye-tracking cameras 140. In this way, control unit 210 may generate the artificial reality content in near real time, based on the depth of field of the user and based on the location of one or more objects as identified by the 3D mesh.

Figure 2B:
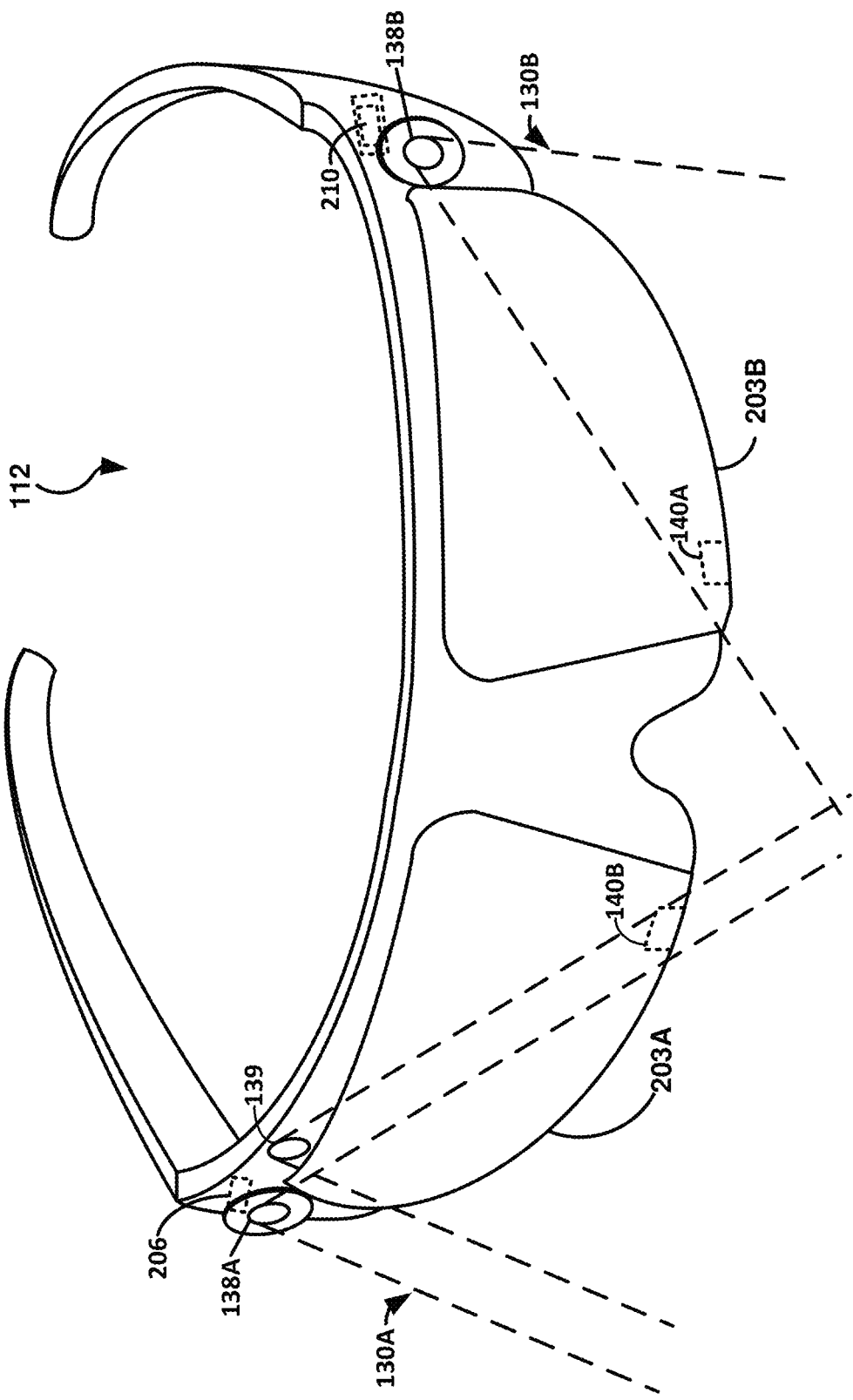
FIG. 2B is a conceptual diagram illustrating another example HMD, in accordance with one or more techniques of this disclosure.

FIG. 2B is a conceptual diagram illustrating another example HMD 112, in accordance with one or more techniques of this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses including a front frame including a bridge to allow the HMD 112 to rest on a user's nose and temples (or "arms") that extend over the user's ears to secure HMD 112 to the user. In addition, HMD 112 of FIG. 2B includes interior-facing varifocal displays 203A and 203B (collectively, "varifocal displays 203") configured to present artificial reality content to the user. Varifocal displays 203 may be any suitable display technology, such as LCDs, quantum dot display, dot matrix displays, LED displays, OLED displays, CRT displays, e-ink, or monochrome, color, or any other type of display capable of generating visual output. In the example shown in FIG. 2B, varifocal displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user. In some examples, HMD 112 may include pupil-replicating waveguides used to carry images in an angular domain generated by miniature projectors directly to the user's eyes.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may include one or more depth sensors 208 which collect depth data indicative of a depth of one or more points and/or objects in the real-world, 3D physical environment of the user of HMD 112. Moreover, HMD 112 may include integrated inside-out image capture devices 138A and 138B (collectively, "inside-out image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, control unit 210 may generate artificial reality content presented by varifocal displays 203. Control unit 210 may generate artificial reality content presented by display 203 by blurring one or more portions of the artificial reality content that are outside of the depth of field of the user of HMD 112. A 3D mesh may indicate a depth of each object included in the artificial reality content relative to a position of HMD 112. In this way, to generate the artificial reality content, control unit 210 may blur or not blur an object in the artificial reality content based on whether a depth of the object as indicated by the 3D mesh is within the depth of field of the user. Control unit 210 may determine the depth of field of the user based on image data collected by eye-tracking cameras 140.

Figure 3:
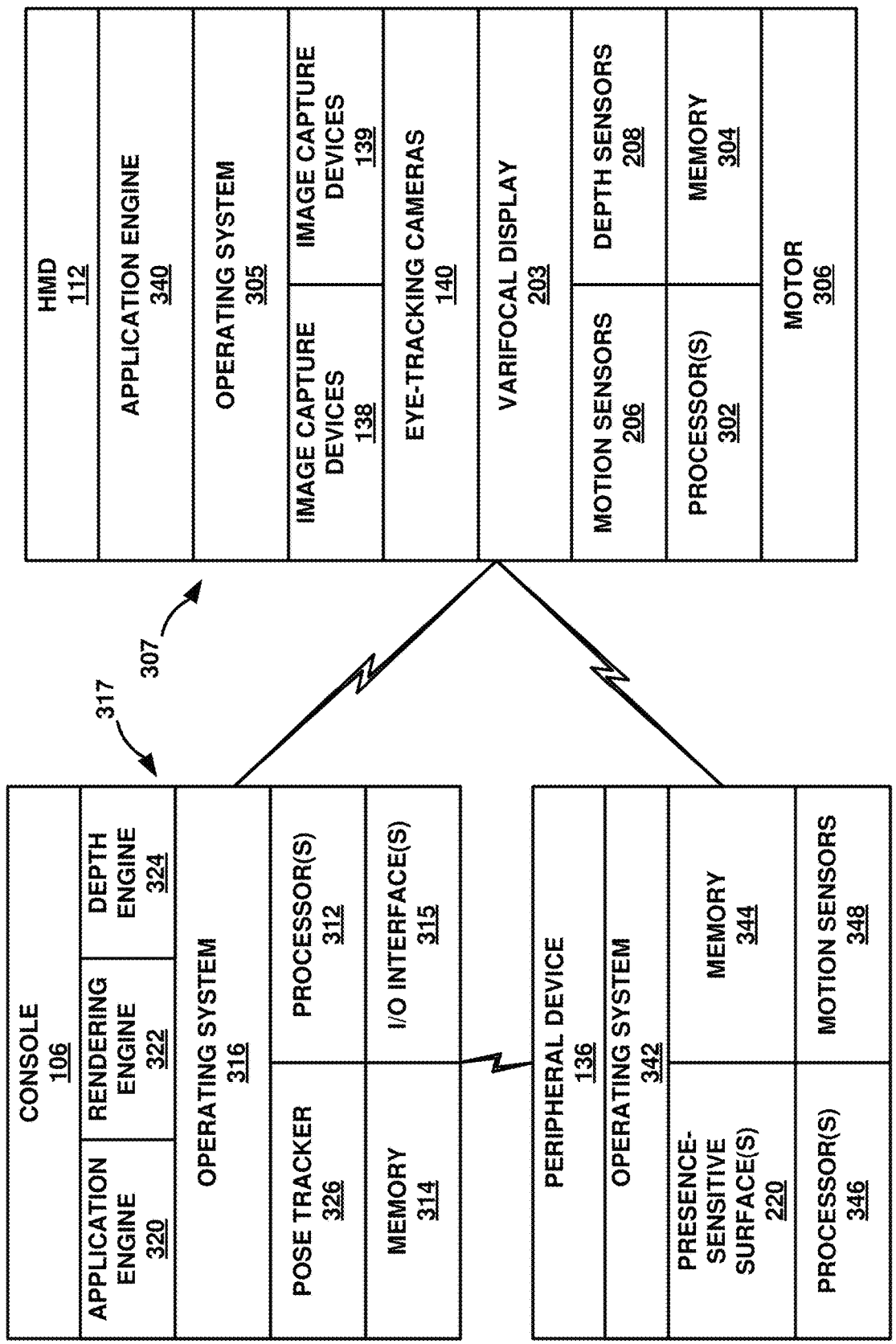
FIG. 3 is a block diagram illustrating example implementations of a console, an HMD, and a peripheral device of one or more multi-device artificial reality systems of FIGS. 1A, 1B, in accordance with one or more techniques of this disclosure.

FIG. 3 is a block diagram illustrating example implementations of console 106, HMD 112, and peripheral device 136 of multi-device artificial reality system 10, of FIGS. 1A, 1B, in accordance with one or more techniques of this disclosure. In the example of FIG. 3, console 106 sets a focal length of varifocal display 203 of HMD 112, affecting a user's perception of artificial reality content displayed by HMD 112. Additionally, or alternatively, console 106 may blur portions of the artificial reality content displayed by HMD 112 in order to mimic a way in which the user of HMD 112 would perceive a real-world, physical environment based on a focus (e.g., a focal length and/or a depth of field) of the user.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to varifocal display 203, motion sensors 206, depth sensors 208 inside-out image capture devices 138, pass-through image capture devices 139, and eye-tracking cameras 140. In some examples, processors 302 and memory 304 may be separate, discrete components. In other examples, memory 304 may be on-chip memory collocated with processors 302 within a single integrated circuit.

In general, console 106 is a computing device that processes image and tracking information received from any one or more of cameras 102 (FIG. 1B), inside-out image capture devices 138, pass-through image capture devices 139, and eye-tracking cameras 140, in order to set a focal length of varifocal display 203 of HMD 112 and/or generate artificial reality content for display by HMD 112. Varifocal display 203 may be connected to a motor 306, where motor 306 is configured to move varifocal display 203 in order to set the focal length of varifocal display 203. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software applications 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, depth engine 324, and pose tracker 326.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 may generate 3D artificial reality content for display to the user by application engine 340 of HMD 112.

In some examples, application engine 320 and rendering engine 322 may construct artificial reality content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and, in accordance with the current pose, trigger certain functionality associated with any rendered virtual content (e.g., places a virtual content item, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

Rendering engine 322 is configured to render, based on a current pose for peripheral device 136, the virtual content in the artificial reality environment that may be locked relative to a position of another object in the artificial reality environment. Rendering engine 322 may scale, rotate, and otherwise transform the virtual content to match the position of the object such that the virtual content appears, in the artificial reality environment, to be overlaid on or near the object. In some examples, rendering engine 322 may slide, translate, or otherwise move one or more virtual rendering cameras based on pose data and/or focus data generated based on image data captured by image capture devices 138, 139.

In some examples, depth engine 324 is configured to generate, based on real-world image data and depth data associated with the real-world image data, a 3D scene of a physical environment of the user 110 of HMD 112. The real-world image data may be captured by pass-through image capture devices 139 of HMD 112, which represent pass-through cameras. In some examples, the depth data may be captured by depth sensors 208 of HMD 112. In some examples, the depth data may be captured by inside-out image capture devices 138 of HMD 112, which represent inside-out cameras. Depth engine 324 may generate artificial reality content (e.g., artificial reality content 122) as an overlay to the 3D scene of the physical environment for display on the varifocal display of the HMD based on a focal point of user 110. In some examples, depth engine 324 may determine the focal point of user 110 based on image data captured by eye-tracking cameras 140.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 342 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can include a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen).

As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 348. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may include any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may include any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Depth engine 324 may generate, based on real-world image data captured by pass-through image capture devices 139 and focus data captured by eye-tracking cameras 140, artificial reality content for display by HMD 112. For example, depth engine 324 may be configured to determine one or both of a focal point of user 110 and a depth of field of user 110 based on the focus data captured by the eye-tracking cameras 140. The focus data, in some examples, may represent image data that indicates a position of a first pupil of the user in relation to a first set of reference points and image data that indicates a position of a second pupil of the user in relation to a second set of reference points. Depth engine 324 may determine the focal point and/or the depth of field of user 110 based on the position of the first pupil in relation to the first set of reference points and the position of the second pupil in relation to the second set of reference points.

In some examples, depth engine 324 may generate a 3D mesh based on depth data collected by depth sensors 208 and/or inside-out image capture devices 138 of HMD 112. Depth engine 324 may generate artificial reality content by overlaying at least a portion of the real-world image data collected by pass-through image capture devices 139 onto the 3D mesh. The 3D mesh and eye-tracking cameras 140 may allow depth engine 324 to provide a varifocal experience to the user of HMD 112. For example, depth engine 324 may set a focal length of varifocal display 203 of HMD 112 in near real-time to match the detected focal point of the user. Additionally, or alternatively, depth engine 324 may blur portions of the artificial reality content displayed by HMD 112 that are outside of the detected depth of field of the user.

Figure 4:
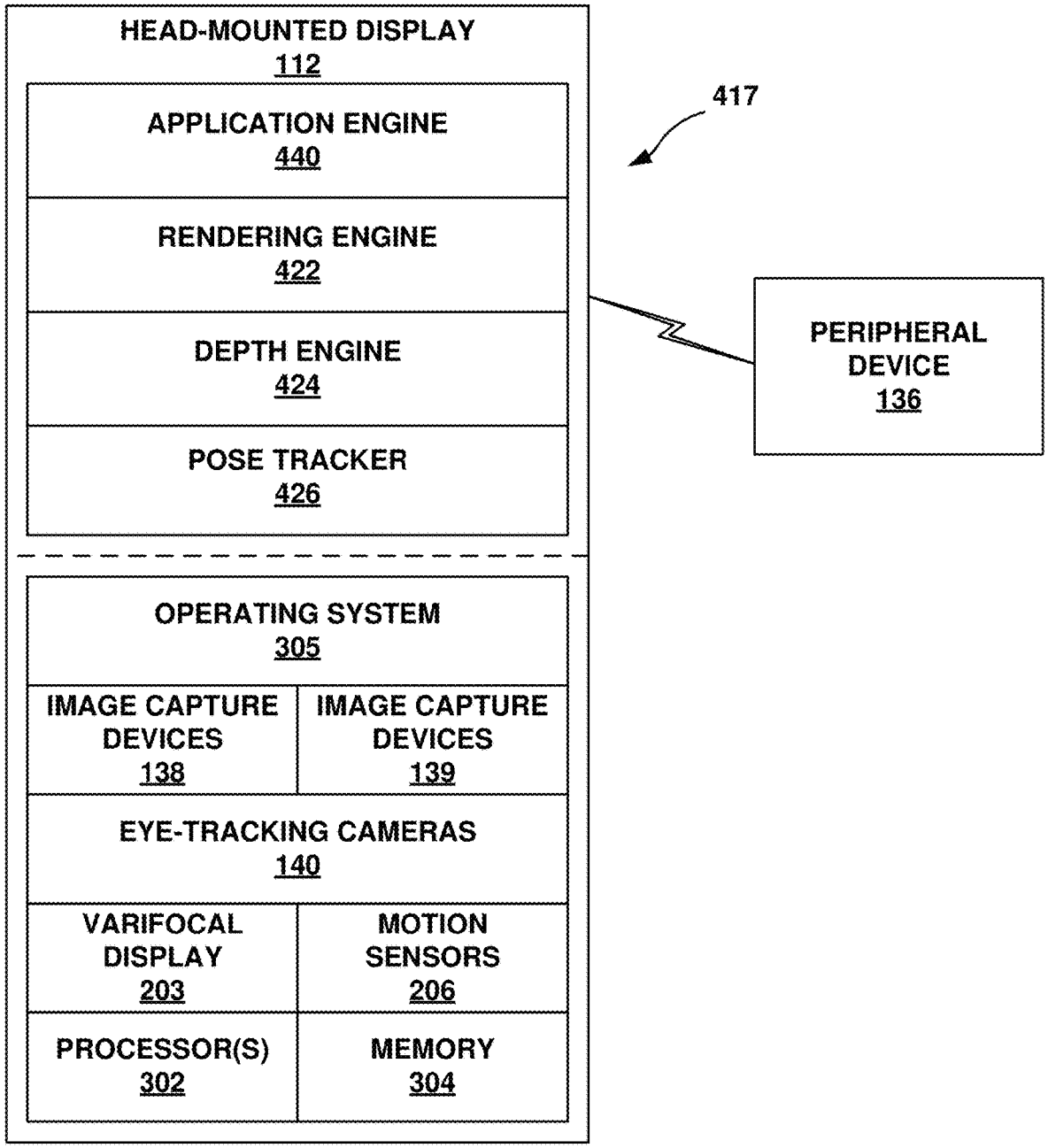
FIG. 4 is a block diagram illustrating an example in which a virtual environment is generated by the HMD of the artificial reality systems of FIGS. 1A, 1B, in accordance with one or more techniques of this disclosure.

FIG. 4 is a block diagram illustrating an example in which a virtual environment is generated by HMD 112 of the artificial reality systems of FIGS. 1A, 1B, in accordance with one or more techniques of this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to varifocal display 203, motion sensors 206, inside-out image capture devices 138, pass-through image capture devices 139, and eye-tracking cameras 140. In the example of FIG. 4, software components 417 operate to provide an overall artificial reality application. In this example, software applications 417 include application engine 440, rendering engine 422, depth engine 424, and pose tracker 426. In various examples, software components 417 operate similar to the counterpart components of console 106 of FIG. 3 (e.g., application engine 320, rendering engine 322, depth engine 324, and pose tracker 326, respectively) to set a focal length of varifocal display 203 of HMD 112 or otherwise affect a user's perception of the artificial reality content provided by HMD 112. In some examples, HMD 112 may communicate with one or more other devices such as peripheral device 136.

Figure 5:
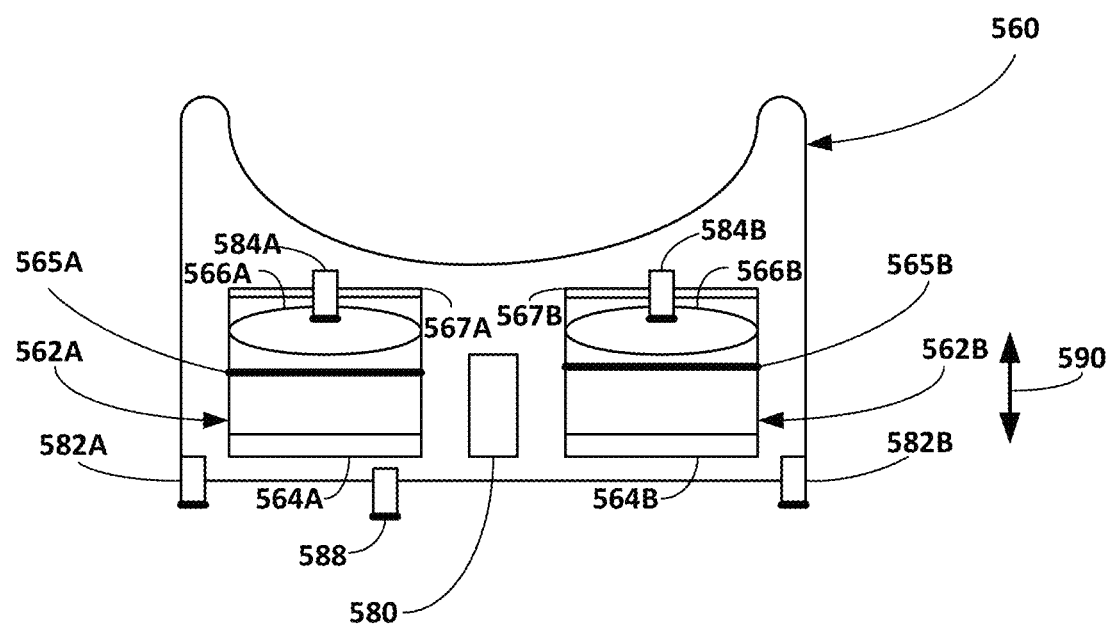
FIG. 5 is a conceptual diagram illustrating example components of an HMD, in accordance with one or more techniques of this disclosure.

FIG. 5 is a conceptual diagram illustrating example components of an HMD 560, in accordance with one or more techniques of this disclosure. HMD 560 may operate substantially similar to any of HMDs 112, 112A, 112B, and 112C, from FIGS. 1A-1B, FIGS. 2A-2B, and FIG. 3. HMD 560 is shown in FIG. 5 as having a headset form factor for ease of illustrating the internal components of HMD 560. In other examples, HMD 560 may include another form factor including an eyeglasses form factor.

HMD 560 includes eyepieces 562A, 562B in which the right eyepiece 562A is configured to present images to the right eye of the user and the left eyepiece 562B is configured to present images to the left eye of the user. Herein, the term "eyepiece" means a three-dimensional geometrical area where images of acceptable quality may be presented to the user's eyes. In the example of FIG. 5, each of eyepieces 562A, 562B includes a varifocal display 564A, 564B coupled to an imaging component 566A, 566B for conveying images generated by the varifocal display 564A, 564B to eyepiece 562A, 562B where the user's eye is positioned when the user is wearing HMD 560. Each of imaging components 566A, 566B may be a lens, a mirror, or any other element having optical (i.e. focusing) power. Each of imaging components 566A, 566B may include a varifocal optical element having tunable or switchable optical power. In some examples, varifocal displays 564A, 564B may be attached to one or more electrical motors configured to move varifocal displays 564A, 564B relative to imaging components 566A, 566B in direction 590. For example, the one or more electrical motors may move varifocal displays 564A, 564B so that a focal length of HMD 560 matches a detected focal point of the user. In some examples, eyepieces 562A, 562B may be referred to as "eye cups."

In some examples, HMD 560 may include a single varifocal display to provide images to both the user's eyes, sequentially or simultaneously. In other examples, HMD 560 may not include imaging components 566A, 566B, and may instead include pupil-replicating waveguides used to carry images in an angular domain generated by miniature projectors directly to the user's eyes.

Each of eyepieces 562A, 562B may include an eye-tracking system for tracking position and orientation of the user's eyes in real-time. The eye-tracking system may include an array of illuminators 567A, 567B for illuminating the user's eye, typically with invisible light such as infrared light, and a hot mirror 565A, 565B for reflecting the infrared light scattered by the user's eye and eye region of the user's face while transmitting visible light from the varifocal display 564A, 564B. The eye-tracking system also includes an eye-tracking cameras 584A, 584B for detecting an image of the user's eye with the pupil and reflections, so-called "glints," of illuminators 567A, 567B from the user's eye, for determining eye position and orientation. Herein, the term "eye region" denotes the area of the user's face including the eyes. The eye region includes the eye itself having a cornea, iris, and pupil. HMD 560 includes inside-out cameras 582A, 582B for capturing image data representative of the physical environment surrounding the user. In some examples, HMD 560 might not include hot mirrors 565A, 565B and may include eye tracking cameras configured to capture the eye region of the user's face without hot mirrors 565A, 565B.

HMD 560 includes a control unit 580 coupled to the other components of HMD 560, including varifocal displays 564A, 564B, imaging components 566A, 566B, illuminators 567A, 567B, eye-tracking cameras 584A, 584B, and inside-out cameras 582A, 582B. Control unit 580 may operate substantially similar to internal control unit 210 of HMD 112 from FIG. 2. For example, during operation of HMD 560, control unit 580 may generate images to be displayed by the varifocal displays 564A, 564B, energizes the illuminators 567A, 567B, obtains images of the eye regions from the corresponding eye-tracking cameras 584A, 584B, and may determine one or more of the user's gaze direction, a convergence angle of the user's eyes from the eye pupils positions, and glints positions in the obtained images. In some examples, the images of the eye regions captured by eye tracking cameras 584A, 584B may include information indicative of a depth of field of the user. In some examples, once the convergence angle has been determined, control unit 580 may adjust the focal lengths of imaging components 566A, 566B to lessen a vergence-accommodation conflict, that is, a discrepancy between the eye vergence angle and the eye focusing distance. In some examples, a focus of artificial reality content may be set based on the depth of field of the user.

In some examples, HMD 580 includes pass-through camera 588 configured to capture image data representative of objects in the real-world, 3D physical environment that are within a field of view of pass-through camera 588. In some examples, a depth engine may overlay at least some of the image data captured by pass-through camera 588 onto a 3D mesh generated using depth data in order to create a 3D scene of a physical environment. HMD 360 may display the 3D scene of a physical environment to a user on varifocal displays 564A, 564B.

Figure 6A:
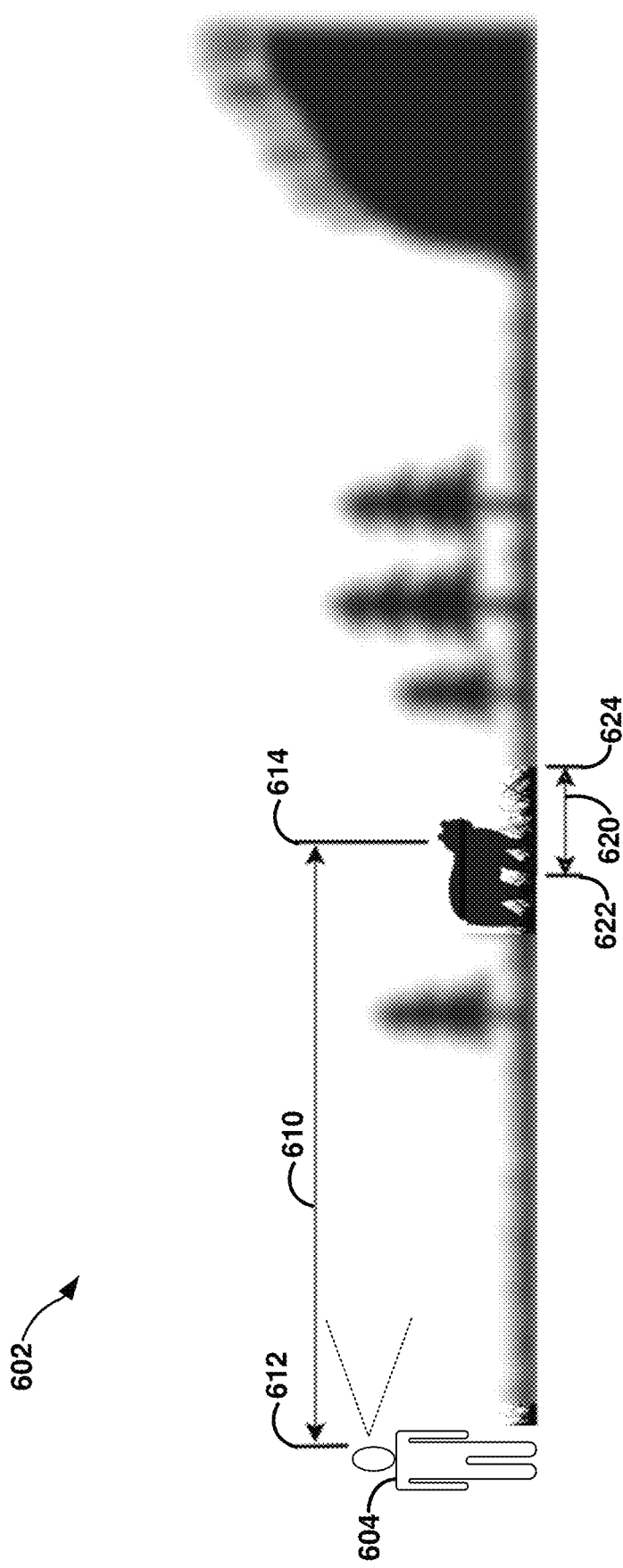
FIG. 6A is a conceptual diagram illustrating the focal length and a first depth of field within an environment, in accordance with one or more techniques of this disclosure.

FIG. 6A is a conceptual diagram illustrating the focal length 610 and a first depth of field 620 within an environment 602, in accordance with one or more techniques of this disclosure. An observer 604 may view environment 602. The focal length 610 may represent a distance between an eye position 612 of observer 604 and a focal point 614 of observer 604. Additionally, the first depth of field 620 of observer 604 may represent a distance between a first near depth of field point 622 and a first far depth of field point 624. The focal point 614 is within the first depth of field 620. As seen in FIG. 6A, objects inside of the first depth of field 620 appear in focus (e.g., sharp) and objects outside of the first depth of field 620 appear out of focus (e.g., blurry). In some examples, observer 604 may use an example HMD (e.g., HMD 112) of FIGS. 1A-4 within environment 602, and the example HMD may present at least some of environment 602 to observer 604 as virtual reality content. The observer 604 may perceive the virtual reality content representing environment 602 as having similar depth characteristics as observer 604 would perceive the real environment 602.

Figure 6B:
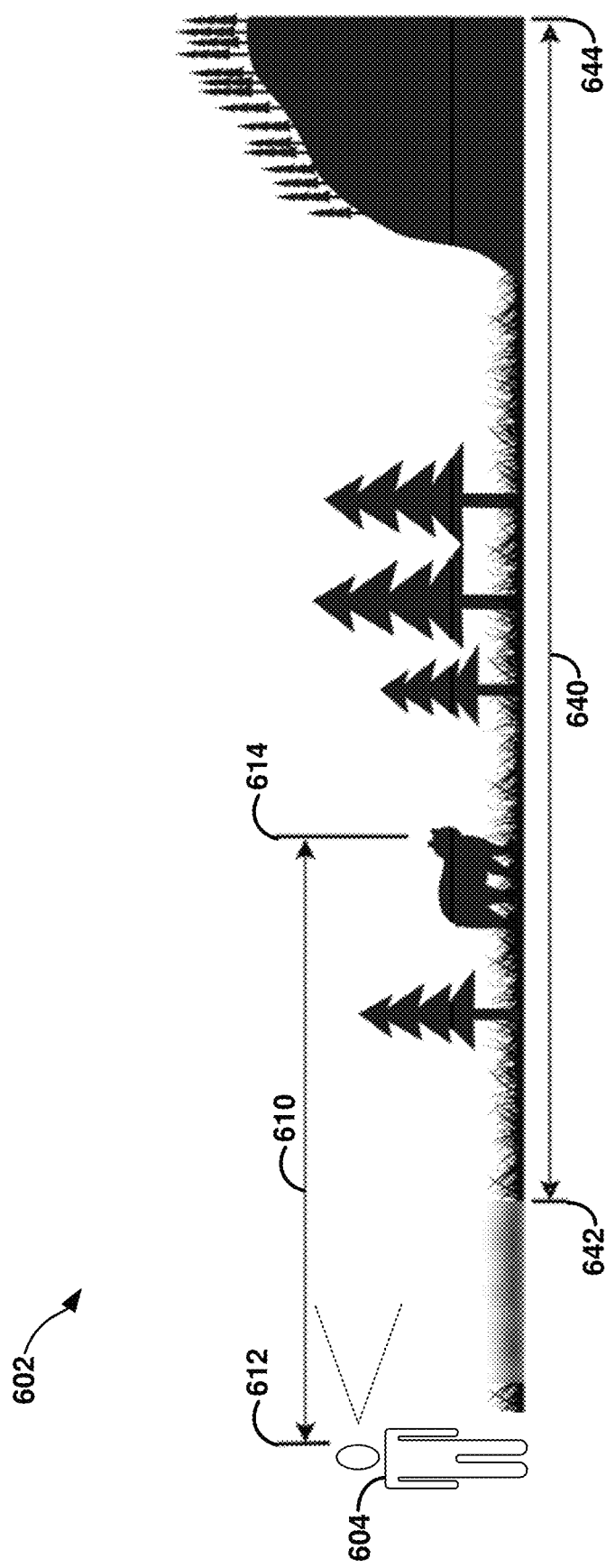
FIG. 6B is a conceptual diagram illustrating a focal length and a second depth of field within an environment, in accordance with one or more techniques of this disclosure.

FIG. 6B is a conceptual diagram illustrating a focal length 610 of FIG. 6A and a second depth of field 640 within an environment 602, in accordance with one or more techniques of this disclosure. The second depth of field 640 of observer 604 may represent a distance between a second near depth of field point 642 and a second far depth of field point 644. The focal point 614 is within the second depth of field 640. As seen in FIG. 6B, objects inside of the second depth of field 640 appear in focus (e.g., sharp) and objects outside of the second depth of field 640 appear out of focus (e.g., blurry). Second depth of field 640 is larger (e.g., longer) than first depth of field 620 of FIG. 6A. As such, more objects of environment 602 are in focus when observer 604 views environment 602 using the second depth of field 640 than when observer 604 views environment 602 using the first depth of field 620. In some examples, observer 604 may use an example HMD (e.g., HMD 112) of FIGS. 1A-4 within environment 602, and the example HMD may present at least some of environment 602 to observer 604 as virtual reality content. The observer 604 may perceive the virtual reality content representing environment 602 as having similar depth characteristics as observer 604 would perceive the real environment 602.

A depth engine (e.g., depth engine 324 of FIG. 3 and/or depth engine 424 of FIG. 4) executed by one or more processors may set the focus of a varifocal display of HMD 112 based on a detected focal point of the observer 604. For example, the depth engine may set a focal length of the varifocal display of HMD 112 to match the detected focal point of observer 604. Additionally, or alternatively, the depth engine may blur or not blur objects within the environment 602 based on a detected depth of field of observer 604 in order to mimic a way in which a user would perceive environment 602 without HMD 112.

Figure 7:
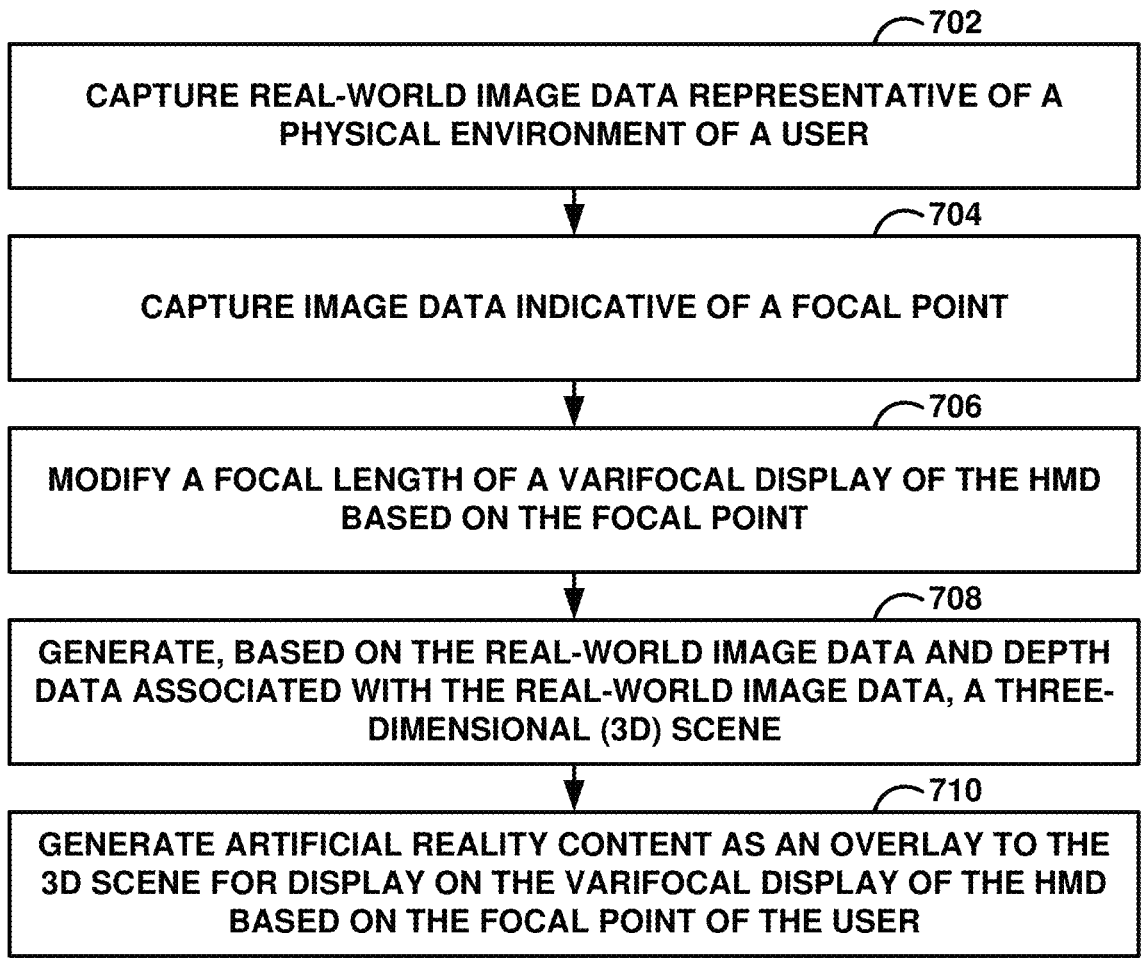
FIG. 7 is a flow diagram illustrating an example operation for providing artificial reality content, in accordance with one or more techniques of this disclosure.

FIG. 7 is a flow diagram illustrating an example operation for providing artificial reality content, in accordance with one or more techniques of this disclosure. FIG. 7 is described with respect to console 106, HMD 112, and peripheral device 136. However, the techniques of FIG. 7 may be performed by different components of console 106, HMD 112, and peripheral device 136, or by additional or alternative devices.

A first image capture device captures real-world image data representative of a physical environment of user 110 (702). For example, the first image capture device may include pass-through image capture devices 139 of HMD 110 which represent pass-through cameras that capture the real-world image data. Additionally, or alternatively, the first image capture device may include other image capture devices of HMD 112 and/or other image captured devices not included by HMD 112. In some cases, the real-world image data representative of the physical environment is within a field of view 130 of pass-through image capture devices 139. Since a user (e.g., user 110) may wear HMD 112, the field of view of pass-through image capture devices 139 may change based on where user 110 is looking.

A set of second image capture devices of HMD 112 captures image data indicative of a focal point of a gaze of user 110 (704). In some examples, the set of second image capture devices includes eye-tracking cameras 140. For example, eye-tracking camera 140A may capture image data indicative of a position of a first pupil (e.g., a left pupil) of user 110 in relation to a first set of reference points and eye-tracking camera 140B may capture image data indicative of a position of a second pupil (e.g., a right pupil) of user 110 in relation to a second set of reference points. In some examples, image data captured by eye-tracking cameras 140 may represent focus data because the position of the first pupil in relation to the first set of reference points and the position of the second pupil in relation to the second set of reference points may be indicative of one or both of a focal point of user 110 and a depth of field of user 110.

HMD 112 may modify a focal length of varifocal display 203 of HMD 112 based on the focal point (706) of user 110 indicated by the image data captured by the set of second image capture devices. For example, a depth engine (e.g., depth engine 324 of FIG. 3 and/or depth engine 424 of FIG. 4) executed by one or more processors may determine the focal point of user 110 based on the image data captured by the set of second image capture devices. Subsequently, the depth engine may cause a motor (e.g., an electric motor) to move varifocal display 203 in order to set the focal length of varifocal display 203 to match the focal point of user 110.

The depth engine generates, based on the real-world image data captured by the first image capture device and depth data associated with the real-world image data, a 3D scene (708) of the physical environment of user 110. The depth data, in some examples, may be captured using inside-out image capture devices 138 and/or depth sensors 308 of HMD 112. The depth engine may generate a 3D mesh of the physical environment of user 110 using the depth data. The 3D mesh may include a set of data points, where a location of each data point of the set of data points relative to each other data point of the set of data points is known. For example, the set of data points may represent a topography of at least a portion of the physical environment of user 110. For example, the 3D mesh includes a digital representation of a location of one or more physical objects and/or points within the physical environment of user 110 (e.g., at least some of the one or more points and/or objects represented in the depth data). The depth engine may overlay at least a portion of the real-world image data onto the 3D mesh to generate the 3D scene.

The depth engine generates artificial reality content 122 as an overlay to the 3D scene for display on varifocal display 203 of HMD 112 based on the detected focal point of user 110 (710). Since the 3D mesh may include data representing a depth of one or more objects and/or points and the real-world image data includes image data representing at least some of the one or more objects and/or points, the artificial reality content may include data reflecting an appearance and a depth of such objects and/or points. The depth engine may generate artificial reality content 122 and modify the focal length of varifocal display 203 in near real time in order to provide a realistic, varifocal, and pass-through experience to user 110.

As described by way of various examples herein, the techniques of the disclosure may include or be implemented in conjunction with an artificial reality system. As described, artificial reality is a form of reality that has been adjusted in some manner before presentation to a user, which may include, e.g., virtual reality (VR), augmented reality, mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method for modifying a focal length of a varifocal display of a head-mounted display (HMD), the HMD configured to output artificial reality content, the method comprising:
    tracking, by a gaze tracker, positions of one or more pupils over a period of time;
    predicting, based on a movement of the positions of the one or more pupils over the period of time, one or more projected future positions of the one or more pupils;
    determining, based on the one or more projected future positions of the one or more pupils, a projected future focal point of a user; and
    modifying, by a depth engine of the HMD, a focal length of the varifocal display of the HMD based on the projected future focal point of the user, wherein modifying the focal length of the varifocal display comprises:
        determining a focal length for the varifocal display that will match the projected future focal point of the user; and
        modifying the varifocal display to achieve the determined focal length that matches the projected future focal point of the user.

2. The method of claim 1 further comprising:
    capturing, by a first image capture device different from one or more image capturing devices, real-world image data representative of a physical environment of the HMD; and
    generating content for display on the varifocal display by:
        generating, based on the real-world image data and depth data associated with the real-world image data, a three-dimensional (3D) scene of the physical environment of the user; and
        generating the content as an overlay to the 3D scene of the physical environment for display on the varifocal display of the HMD, wherein the content is the artificial reality content.

3. The method of claim 2,
    wherein the first image capture device comprises a pass-through camera; and
    wherein the pass-through camera captures the real-world image data in color.

4. The method of claim 3, further comprising:
    executing, by one or more processors proximate to the pass-through camera, the depth engine.

5. The method of claim 2, further comprising:
    generating, by a depth sensor of the HMD, the depth data;
    wherein generating the 3D scene of the physical environment comprises:
        generating, using the depth data, a 3D mesh of a real-world scene; and
        overlaying at least a portion of the real-world image data onto the 3D mesh of the real-world scene.

6. The method of claim 5,
    wherein the real-world image data represents a stream of real-world image data;
    wherein the depth data represents a stream of depth data; and
    wherein generating the artificial reality content comprises generating, using the stream of real-world image data and the stream of depth data, the artificial reality content in near real-time based on a position and an orientation of the HMD with respect to the 3D mesh of the real-world scene.

7. The method of claim 1, further comprising:
capturing, by a first eye-tracking camera of one or more image capture devices, a first set of image data including a current position of a first pupil of the one or more pupils in relation to a first set of reference points;
capturing, by a second eye-tracking camera of the one or more image capture devices, a second set of image data including a current position of a second pupil of the one or more pupils in relation to a second set of reference points; and
determining, by the depth engine, a current focal point of the user based on the current position of the first pupil in relation to the first set of reference points and the current position of the second pupil in relation to the second set of reference points.

8. The method of claim 1, wherein modifying the focal length of the varifocal display includes controlling a motor of the HMD, configured to modify the focal length of the varifocal display by controlling a position of the varifocal display, by moving the varifocal display to achieve the determined focal length to match the determined projected future focal point of the user.

9. The method of claim 1, further comprising outputting, to the varifocal display, the artificial reality content.

10. A non-transitory computer-readable storage medium storing instructions that, when executed by a computing system, cause the computing system to perform a process for modifying a focal length of a varifocal display of a head-mounted display (HMD), the HMD configured to output artificial reality content, the process comprising:
tracking, by a gaze tracker, positions of one or more pupils over a period of time;
predicting, based on a movement of the positions of the one or more pupils over the period of time, one or more projected future positions of the one or more pupils;
determining, based on the one or more projected future positions of the one or more pupils, a projected future focal point of a user; and
modifying, by a depth engine of the HMD, a focal length of the varifocal display of the HMD based on the projected future focal point of the user, wherein modifying the focal length of the varifocal display comprises:
determining a focal length for the varifocal display that will match the projected future focal point of the user; and
modifying the varifocal display to achieve the determined focal length that matches the projected future focal point of the user.

11. The non-transitory computer-readable storage medium of claim 10, wherein the process further comprises outputting, to the varifocal display, the artificial reality content.

12. The non-transitory computer-readable storage medium of claim 10, wherein the process further comprises:
capturing, by a first image capture device different from one or more image capturing devices, real-world image data representative of a physical environment of the HMD; and
generating content for display on the varifocal display by:
generating, based on the real-world image data and depth data associated with the real-world image data, a three-dimensional (3D) scene of the physical environment of the user; and
generating the content as an overlay to the 3D scene of the physical environment for display on the varifocal display of the HMD, wherein the content is the artificial reality content.

13. The non-transitory computer-readable storage medium of claim 12,
wherein the first image capture device comprises a pass-through camera; and
wherein the pass-through camera captures the real-world image data in color.

14. The non-transitory computer-readable storage medium of claim 13, wherein the process further comprises:
executing, by one or more processors proximate to the pass-through camera, the depth engine.

15. The non-transitory computer-readable storage medium of claim 12, wherein the process further comprises:
generating, by a depth sensor of the HMD, the depth data;
wherein generating the 3D scene of the physical environment comprises:
generating, using the depth data, a 3D mesh of a real-world scene; and
overlaying at least a portion of the real-world image data onto the 3D mesh of the real-world scene.

16. The non-transitory computer-readable storage medium of claim 15,
wherein the real-world image data represents a stream of real-world image data;
wherein the depth data represents a stream of depth data; and
wherein generating the artificial reality content comprises generating, using the stream of real-world image data and the stream of depth data, the artificial reality content in near real-time based on a position and an orientation of the HMD with respect to the 3D mesh of the real-world scene.

17. The non-transitory computer-readable storage medium of claim 10, wherein the process further comprises:
capturing, by a first eye-tracking camera of one or more image capture devices, a first set of image data including a current position of a first pupil of the one or more pupils in relation to a first set of reference points;
capturing, by a second eye-tracking camera of the one or more image capture devices, a second set of image data including a current position of a second pupil of the one or more pupils in relation to a second set of reference points; and
determining, by the depth engine, a current focal point of the user based on the current position of the first pupil in relation to the first set of reference points and the current position of the second pupil in relation to the second set of reference points.

18. The non-transitory computer-readable storage medium of claim 10, wherein modifying the focal length of the varifocal display includes controlling a motor of the HMD, configured to modify the focal length of the varifocal display by controlling a position of the varifocal display, by moving the varifocal display to achieve the determined focal length to match the determined projected future focal point of the user.

19. A computing system for modifying a focal length of a varifocal display of a head-mounted display (HMD), the HMD configured to output artificial reality content, the computing system comprising:
one or more processors; and
one or more memories storing instructions that, when executed by the one or more processors, cause the computing system to perform a process comprising:

tracking, by a gaze tracker, positions of one or more pupils over a period of time;

predicting, based on a movement of the positions of the one or more pupils over the period of time, one or more projected future positions of the one or more pupils;

determining, based on the one or more projected future positions of the one or more pupils, a projected future focal point of a user; and modifying, by a depth engine of the HMD, a focal length of the varifocal display of the HMD based on the projected future focal point of the user, wherein modifying the focal length of the varifocal display comprises:

determining a focal length for the varifocal display that will match the projected future focal point of the user; and modifying the varifocal display to achieve the determined focal length that matches the projected future focal point of the user.

20. The computing system of claim 19, wherein the process further comprises:

capturing, by a first image capture device different from one or more image capturing devices, real-world image data representative of a physical environment of the HMD; and generating content for display on the varifocal display by:

generating, based on the real-world image data and depth data associated with the real-world image data, a three-dimensional (3D) scene of the physical environment of the user; and generating the content as an overlay to the 3D scene of the physical environment for display on the varifocal display of the HMD, wherein the content is the artificial reality content.

* * * * *